United States Patent [19]

Blankenship

[11] 4,205,403
[45] Jun. 3, 1980

[54] INCINERATOR URINAL

[75] Inventor: Ernest B. Blankenship, Dallas, Tex.

[73] Assignee: Research Products/Blankenship Corporation, Dallas, Tex.

[21] Appl. No.: 38,649

[22] Filed: May 14, 1979

Related U.S. Application Data

[63] Continuation-in-part of Ser. No. 858,185, Dec. 7, 1977, Pat. No. 4,159,547.

[51] Int. Cl.² ............................................. A47K 11/02
[52] U.S. Cl. ...................................... 4/111.1; 4/111.5
[58] Field of Search ................ 4/111.1, 111.2, 111.3, 4/111.4, 111.5, 111.6, 301, 305, 306, 309

[56] References Cited

U.S. PATENT DOCUMENTS

| | | | |
|---|---|---|---|
| 3,020,559 | 2/1962 | Blankenship et al. | 4/111.2 |
| 3,169,497 | 2/1962 | Blankenship et al. | 4/111.5 X |
| 3,251,070 | 5/1966 | Blankenship | 4/111.5 |
| 3,486,174 | 12/1969 | Nordstadt et al. | 4/111.5 |
| 3,649,970 | 3/1972 | Blankenship | 4/111.5 |
| 3,890,653 | 6/1975 | Blankenship | 4/111.5 |
| 3,921,227 | 11/1975 | Blankenship | 4/111.5 |
| 3,943,579 | 3/1976 | Blankenship | 4/111.5 |
| 4,159,547 | 7/1979 | Blankenship | 4/111.1 |

Primary Examiner—Henry K. Artis
Attorney, Agent, or Firm—Wofford, Fails, & Zobal

[57] ABSTRACT

An incinerator urinal having an annular catalyst chamber for holding heat activated catalyst particles for removing odor from the gases during incineration and an upper reservoir chamber for supplying heat activated catalyst particles to the annular chamber as the particles therein erode due to the effects of heating and cooling upon repeated use of the heater of the urinal. A sleeve extends through the upper chamber and a removable drain tube extends from the outlet of the upper bowl of the urinal through the sleeve for allowing the flow of liquid effluent to a lower pan.

20 Claims, 4 Drawing Figures

U.S. Patent   Jun. 3, 1980   Sheet 1 of 2   4,205,403
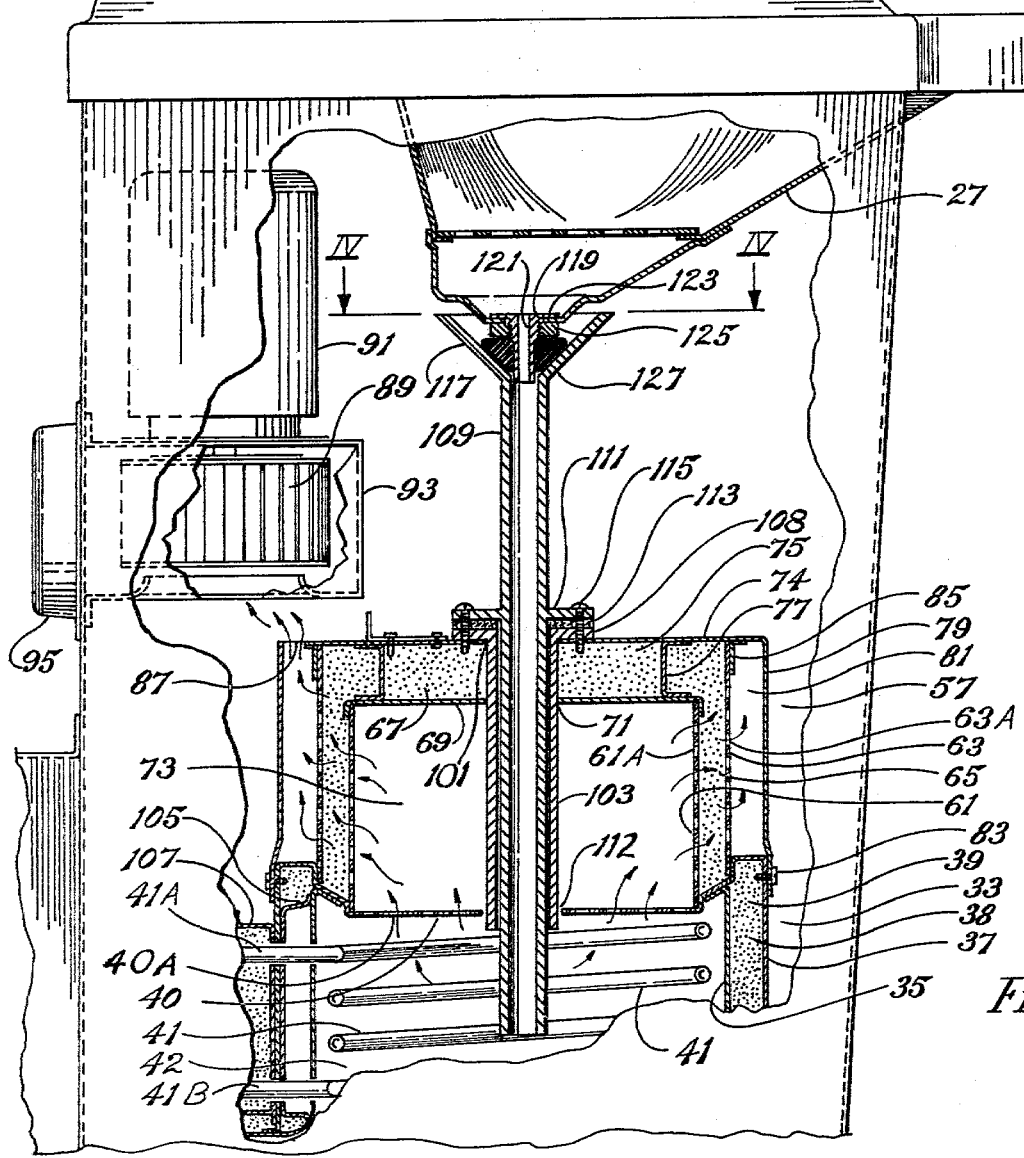

INCINERATOR URINAL

This application is a continuation-in-part of U.S. patent application Ser. No. 858,185, filed: Dec. 7, 1977 now U.S. Pat. No. 4,159,547.

BACKGROUND OF THE INVENTION

1. Field of the Invention

This invention relates to an improved incinerator urinal.

2. Description of the Prior Art

U.S. Pat. Nos. 3,251,070 and 3,649,970 are two of my earlier patents directed to incinerator urinals.

SUMMARY OF THE INVENTION

It is an object of the present invention to provide an incinerator urinal having a sealed drain tube extending through the top portion of a catalyst chamber and which is easy to remove and clean or replace.

It is a further object of the present invention to provide an incinerator urinal having a main catalyst chamber which presents a large cross-sectional area of heat activated catalyst particles to the flow of odor and also having a reservoir chamber for supplying heat activated catalyst particles to the main chamber as the particles therein erode due to the effects of heating and cooling upon use of the heater of the urinal.

BRIEF DESCRIPTION OF THE DRAWINGS

FIG. 1 is a perspective view of the incinerator urinal of the present invention.

FIG. 2 is a partial cross-sectional side view of the incinerator urinal of FIG. 1.

FIG. 3 illustrates the lower ashpan of the incinerator urinal of FIGS. 1 and 2. The scale of FIG. 3 is reduced from that of FIG. 2.

FIG. 4 is shown in partial cross-section with the blower removed. The components within the funnel of the drain tube also are not shown in FIG. 4.

DESCRIPTION OF THE PREFERRED EMBODIMENT

Figure 4:
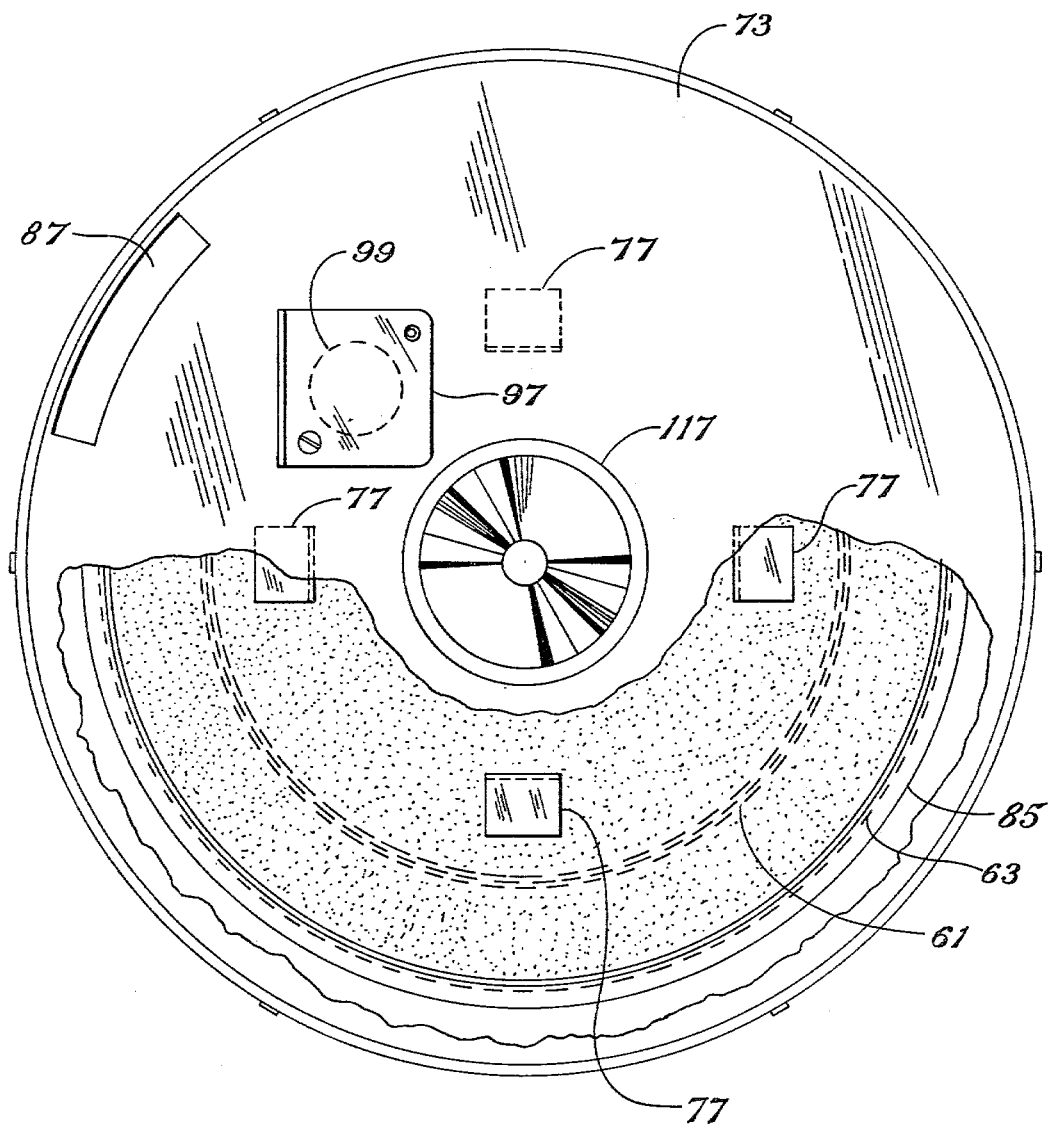
FIG. 4 is an enlarged view of the incinerator urinal of FIG. 2 as seen along the lines 4—4 thereof.

Referring now to the drawings, the incinerator urinal of the present invention is identified at 21. It comprises a housing 23 having an enclosed compartment 25 and a funnel shaped bowl 27 having an enlarged opening 29 at the front 31 of the urinal 21. Located in the compartment 25 below the bowl 27 is an incinerator chamber 33 supported by the housing by means not shown. The chamber 33 comprises annular inner and outer walls 35 and 37 respectively forming an annular chamber 38 in which is located heat insulating material 39. The outer wall 37 has integrally formed therewith a dish shaped wall 40 which forms the top of the incinerator chamber 33. A plurality of apertures 40A are formed through the wall 40. The incinerator chamber 33 has an electrical heater coil 41 supported in the interior space 42 of the chamber 33 by brackets (not shown) coupled to the inside of wall 35. The terminal ends 41A and 41B of coil 41 extends through pans 105 and 107 as disclosed in and claimed in my U.S. Pat. No. 3,943,579. The lower end of the chamber 33 is open at 45 and is in fluid communication with a removable drain pan or ashpan 47 which rests on a member 49 which is coupled to the base 51 of the housing. The pan 47 may be removed by removing the lower front panel 53 and pulling the pan 47 out by its handle 55.

Snuggly fitted to the top of the chamber 33 is a catalyst container 57 which is round in cross-section. The container 57 comprises spaced apart inner and outer annular walls 61 and 63 defining an annular catalyst chamber 65 for holding heat activated catalyst particles 67 which may be aluminum oxide ($Al_2O_3$) pellets. Walls 61 and 63 have a plurality of apertures 61A and 63A formed therethrough respectively. Coupled to the top edge of wall 61 is a circular inner top wall 69 having a central aperture 71 formed therethrough. Inner annular wall 61 and top wall 69 define a central space 73 in fluid communication with the interior space 42 of incinerator chamber 33 by way of apertures 40A formed through wall 40. A circular outer top wall 74 engages the top edge of outer annular wall 63 defining an inwardly extending horizontal reservoir chamber 75 between inner top wall 69 and outer top wall 74 for holding additional heat activated catalyst particles 67. Members 77 are spacers for holding the walls 69 and 74 vertically apart. Four spaced apart spacers 77 are shown in FIG. 4. Wall 74 extends outwardly beyond annular wall 63 and has integrally formed therewith a downwardly extending annular wall 79 defining an annular gas collection chamber 81 surrounding annular wall 63. The lower ends of annular walls 61 and 63 rest on wall 40 and the lower end of annular wall 79 is removably secured to the outer wall 37 of incinerator chamber 33 by metal screws 83. Member 85 is a bracket secured to the inside of wall 74 for holding annular wall 63 in place. An opening 87 is formed through top wall 74 for forming a gas outlet from collection chamber 81. The outlet 87 is located below a blower wheel 89 which is operated by an electrical motor 91. The outlet of the blower housing 93 is coupled to a collar 95 which is adapted to be coupled to an exhaust vent (not shown). Member 97 is a cover for covering an opening 99 formed through top wall 74. Heat activated catalyst particles may be inserted into the reservoir chamber 75 through opening 99 when the cover 97 is moved to an open position.

A central opening 101 is formed through top wall 74 and a ceramic sleeve 103 is inserted through openings 101 and 71 and through a central opening 112 formed through perforated incinerator chamber wall 40 into the interior space 42 of the incinerator chamber 33. The sleeve 103 has an upper flange or rim 108 which engages the upper surface of top wall 74. A ceramic drain tube 109 removably extends from the bowl 27 through the sleeve 103 into the interior space 42 of the incinerator chamber 33. The drain tube 109 has an outwardly extending rim 111 which is removably attached to flange 108 with an annular sealing gasket 113 located therebetween. Attachment is by way of metal screws 115 which are threaded through apertures formed through rim 111, gasket 113, flange 108 and wall 74.

The top of drain tube 109 has a funnel shaped end 117 which is located below the lower outlet of bowl 27. The outlet comprises an opening 119 having a threaded conduit 121 inserted therethrough. The upper end of the conduit 121 has a rim 123 which engages the lower surface of bowl 27. A nut 125 is threaded to the conduit 121 to hold it in place and to form a seal between the conduit and the lower portion of the bowl 27. The lower portion of conduit 121 is smooth and is inserted into a cone shaped resilient sealing member 127 having an outer surface which conforms with the inner surface of the funnel end 117. Thus member 127 forms a seal between the outer surface of conduit 121 and the inner surface of funnel 117.

The tube 109 drains urine from the bowl 27 to the pan 47. After use, the user presses a button (not shown) which actuates the heater coil 41 and blower motor 91 for a preset time period controlled by a timer (not shown). Heat is applied to the waste in the pan 47 by means of the heater coil 41 mounted above the pan. Urine is evaporated and solids subsequently are dried and fried to leave only ash.

The blower wheel 89 draws air and gases from the pan 47 and the interior 42 of the incinerator chamber 33 through the heat activated catalyst 67 in chamber 65, through the outlet 87 and out through the collar 95 to the exhaust vent. The flow of air from the pan 47 to the outlet 87 is by way of the interior 42 of the incinerator chamber 33, apertures 40A formed through wall 40, the interior 73 of container 57, apertures 61A, the heat activated catalyst 67 in annular vertical chamber 65, aperture 63A, and the gas collection chamber 81. The purpose of the heat activated catalyst 67 is to reduce the odor as the air and gases pass through the catalyst.

The incinerator urinal of the present invention has advantages since the annular vertical bed of catalyst particles in annular catalyst chamber 67 present a very large cross-section to the flow of odor. This allows sufficient dwell time of the odor molecules within the catalyst for the largest rate of evaporation. It also reduces the resistance to gas flow i.e., steam generated when the unit is used at maximum temperature and, hence, maximum rate of steaming. Temperature and, therefore, heat content of the total system increases rapidly once the urine of a prior deposit has evaporated, ashpan temperatures being 600° F. typically. If the system is used as a urinal at that point of maximum heat content, a copious amount of steam is generated and requires a cross-sectional area of the catalyst several times larger than that required for the normal rate of evaporation, that is at 212° F. A vertically mounted annular catalyst section having an inner diameter of 8 inches and a height of 7 inches will have a cross-sectional area to the flow of odor of approximately square inches.

The catalyst used is friable and tends to be crushed with the contraction and expansion due to the heating and cooling effects resulting upon repeated use of the incinerator heater coil. This action causes erosion of the catalyst causing it to become powder-like over a period of time. In a horizontal bed of catalyst, the powder tends to collect along the bottom portion of the catalyst container, namely, along the bottom perforated portion clogging these perforations which prevent free influx of the odor through the catalyst. In a vertical bed of catalyst, the powder will settle to the bottom without clogging the upper perforations resulting in longer periods before clean out and replacement of the catalyst is required.

As shown and described above, the horizontal catalyst reservoir 75 is connected to and leads to the upper portion of the annular vertical catalyst chamber 65. As the catalyst in annular chamber 65 turns to powder and settles to the bottom, the void at the top portion of chamber 65 is filled with fresh catalyst particles from the horizontal reservoir chamber 75 thus extending the time period further before clean out and replacement of catalyst is required.

The drain tube 109 is removable for cleaning or replacement yet odor is prevented from escaping and bypassing the catalyst with the arrangement shown including seals 113 and 127. It may be removed by removing the bowl 27, unthreading screws 115 and lifting it upward and out of sleeve 103. Since the drain tube 109 is straight, it can be readily cleaned with a straight wire brush. When installed, it protudes into the interior 42 of the incinerator chamber 33 so as to insure that the draining urine falls into the ashpan 47. Since the lower end of the drain tube 109 terminates within the incinerator chamber 33, it does not limit the height of the ashpan and hence its volume.

In one embodiment, walls 35, 37, 61, 63, 69, 74, and 79 may be formed of stainless steel. Drain tube 109 and sleeve 103 are formed of ceramic material, however, they also may be formed of stainless steel. Annular walls 61 and 63 are not secured to wall 40 but merely rest thereon. Similarly wall 69 merely rests on the upper edge of annular wall 61. The top 74 also merely rests on the upper edge of annular wall 63. The annular exterior wall 79 is removably secured to the outer annular wall 37 of the incinerator chamber 33 by way metal screws 83 as mentioned above. Thus the catalyst container 57 may be readily disassembled.

If desired, the center portion of the perforated wall 40 of the incinerator chamber 33 may be removed with an outer edge left sufficient to support the annular walls 61 and 63 of the container 57.

What is claimed is:
1. An incinerator urinal comprising:
a housing,
incinerator chamber means located in said housing,
bowl means located above said incinerator chamber means for receiving liquid effluent,
pan means adapted to be located below said incinerator means and in fluid communication with said incinerator chamber means,
drain tube means for allowing the flow of liquid effluent from a lower outlet of said bowl means to said pan means,
heater means for applying heat to the effluent deposited in said pan means,
container means located above said incinerator chamber means and below said bowl means,
said container means comprising spaced apart inner and outer annular walls defining an annular catalyst chamber for holding heat activated catalyst particles,
spaced apart inner and outer top walls coupled to the top edges of said inner and outer annular wall respectively and extending inwardly defining an inwardly extending catalyst chamber for holding heat activated particles,
said inner annular wall and said inner top wall defining a central space in fluid communication with the interior of said incinerator chamber means,
said inner and outer annular walls having apertures formed therethrough,
exterior wall means surrounding said outer annular wall defining an annular gas collection chamber,
outlet means formed through said exterior wall means,
gas removal means for drawing gases from said pan by way of the interior of said incinerator chamber, said central space, said apertures formed through said inner annular wall, said heat activated catalyst in said annular catalyst chamber, said apertures formed through said outer annular wall, said annular gas collection chamber, and said outlet means, said inwardly extending catalyst chamber being connected to said annular catalyst chamber whereby the heat activated catalyst particles in said inwardly extending catalyst chamber may pass into said annular catalyst chamber as the heat activated catalyst particles therein erode due to the effects of heating and cooling resulting from the use of said heater of said incinerator urinal.

2. The incinerator urinal of claim 1 comprising:

sleeve means extending through said inner and outer top walls, said drain tube means removably extending from said bowl means through said sleeve means, means froming a seal between said drain tube means and said sleeve means.

3. The incinerator urinal of claim 2 wherein:

said sleeve means comprises of an outwardly extending flange securable to the top portion of said outer top wall, said drain tube means comprises an outwardly extending rim adapted to be located above and removably secured to said outwardly extending flange of said sleeve means with a seal means located therebetween.

4. The incinerator urinal of claim 1 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means having an outer surface conforming to the shape of the inside surface of said funnel shaped end of said drain tube means to form a seal between said conduit means and said funnel shape end of said drain tube means.

5. The incinerator urinal of claim 2, wherein:

said drain tube means comprises an upper funnel shaped end located below said lower outlet of said bowl means, conduit means coupled to said lower outlet of said bowl means and extending downward into said funnel shaped end of said drain tube means, and seal means fitted around said conduit means and having an outer surface conforming to the shape of the inside surface of said funnel shaped end of said drain tube means to form a seal between said conduit means and said funnel shape end of said drain tube means.

6. The incinerator urinal of claim 3, wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

7. An incinerator urinal, comprising:

a housing, incinerator chamber means located in said housing, bowl means located above said incinerator chamber means for receiving liquid effluent, pan means adapted to be located below said incinerator chamber means and in fluid communication with said incinerator chamber means, drain tube means for allowing the flow of liquid effluent from a lower outlet of said bowl means to said pan means, heater means for applying heat to the effluent deposited in said pan means, container means located above said incinerator chamber means and below said bowl means, said container means comprising spaced apart inner and outer vertical walls defining a vertical catalyst chamber for holding heat activated catalyst particles and which chamber surrounds a central space, spaced apart inner and outer top walls coupled to the top edges of said inner and outer vertical walls respectively and extending inwardly defining an inwardly extending catalyst chamber for holding heat activated catalyst particles, said central space being in fluid communication with the interior of said incinerator chamber means, said inner and outer vertical walls having apertures formed therethrough, an exterior wall means surrounding said outer vertical wall defining a gas collection chamber, outlet means formed through said exterior wall means, gas removal means for drawing gases from said pan means by way of the interior of said incinerator chamber means, said central space, said apertures formed through said inner vertical wall, said heat activated catalyst in said vertical catalyst chamber, said apertures forming through said outer vertical wall, said gas collection chamber, and said outlet means, said inwardly extending catalyst chamber being connected to said vertical catalyst chamber whereby the heat activated catalyst particles in said inwardly extending catalyst chamber may pass into said vertical catalyst chamber as the heat activated catalyst particles therein erode due to the effects of heating and cooling upon the use of said heater of said incinerator urinal.

8. The incinerator urinal of claim 7 comprising:

sleeve means extending through said inner and outer top walls, said drain tube means removably extending from said bowl means through said sleeve means, means forming a seal between said drain tube means and said sleeve means.

9. The incinerator urinal of claim 8 wherein:

said sleeve means comprises an outwardly extending flange securable to the top portion of said top wall, said drain tube means comprises an outwardly extending rim adapted to be located above and removably secured to said outwardly extending flange of said sleeve means with a seal located therebetween.

10. The incinerator urinal of claim 7 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

11. The incinerator urinal of claim 8 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

12. The incinerator urinal of claim 9 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

13. An incinerator urinal comprising:

a housing, incinerator chamber means located in said housing and having a central opening, bowl means located above said incinerator chamber means for receiving liquid effluent, pan means adapted to be located below said incinerator chamber means and in fluid communication with said central opening of said incinerator chamber means, drain tube means for allowing the flow of liquid effluent from a lower outlet of said bowl means to said pan means, heater means for applying heat to the effluent deposited in said pan means, container means located above said incinerator chamber means and below said bowl means, said container means comprising spaced apart inner and outer walls defining an annular catalyst chamber for holding heat activated catalyst particles, top wall means coupled with the top edges of said inner and outer annular walls respectively and extending inwardly, said inner annular wall and said top wall means defining a central space having a closed top, said central space being in fluid communication with said central opening of said incinerator chamber means, said inner and outer walls having apertures formed therethrough, exterior wall means surrounding said outer annular wall defining an annular gas collection chamber, outlet means formed through said exterior wall means, gas removal means for drawing gases from said pan means by way of central opening of said incinerator chamber means, said central space, said apertures formed through said inner annular wall, said heat activated catalyst in said annular catalyst chamber, said apertures formed through said outer annular wall, said annular gas collection chamber and said outlet means, sleeve means extending through said top wall means, said drain tube means removably extending from said bowl means through said sleeve means, means forming a seal between said drain tube means and said sleeve means.

14. The incinerator urinal of claim 13, wherein:

said sleeve comprises an outwardly extending flange securable to the top portion of said top wall means, said drain tube means comprises an outwardly extending rim adapted to be located above and removably secured to said outwardly extending flange of said sleeve means with a seal located therebetween.

15. The incinerator urinal of claim 13 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

16. The incinerator urinal of claim 14 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

17. An incinerator urinal comprising:

a housing, incinerator chamber means located in said housing and having a central opening, bowl means located above said incinerator chamber means for receiving liquid effluent, pan means adapted to be located below said incinerator chamber means and in fluid communication with said central opening of said incinerator chamber means, drain tube means for allowing the flow of liquid effluent from a lower outlet of said bowl means to said pan means, heater means for applying heat to the effluent deposited in said pan means, container means located above said incinerator chamber means and below said bowl means, said container means comprising spaced apart inner and outer vertical walls defining a vertical catalyst chamber for holding heat activated catalyst particles and which chamber surrounds a central space, top wall means coupled to the top edges of said inner and outer walls and extending inwardly, said central space being in fluid communication with said central opening of said incinerator chamber means, said inner and outer vertical walls having apertures formed therethrough, exterior wall means surrounding said outer vertical wall defining a gas collection chamber, outlet means formed through said exterior wall means, gas removal means for drawing gases from said pan means by way of said central opening of said incinerator chamber means, said central space, said apertures formed through said inner vertical wall, said heat activated catalyst in said vertical catalyst chamber, said apertures formed through said outer vertical wall, said gas collection chamber, and said outlet means, sleeve means extending through said top wall means, said drain tube means removably extending from said bowl means through said sleeve means, means forming a seal between said drain tube means and said sleeve means.

18. The incinerator urinal of claim 17 wherein:

said sleeve means comprises an outwardly extending flange securable to the top portion of said top wall means, said drain tube means comprises an outwardly extending rim adapted to be located above and removably secured to said outwardly extending flange of said sleeve means with a seal located therebetween.

19. The incinerator urinal of claim 17 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

20. The incinerator urinal of claim 18 wherein:

said drain tube means comprises an upper funnel shaped end located below said lower outlet of said bowl means, conduit means coupled to said lower outlet of said bowl means and extending downwardly into said funnel shaped end of said drain tube means, and seal means fitted around said conduit means and having an outer surface conforming to the shape of the inside surface of said funnel shaped end of said drain tube means to form a seal between said conduit means and said funnel shaped end of said drain tube means.

* * * * *